US012233296B1

(12) United States Patent
Lin et al.

(10) Patent No.: US 12,233,296 B1
(45) Date of Patent: Feb. 25, 2025

(54) STAND FOR FIRE EXTINGUISHER

(71) Applicants: Joe Lin, Missouri City, TX (US); Brian Liu, Houston, TX (US)

(72) Inventors: Joe Lin, Missouri City, TX (US); Brian Liu, Houston, TX (US)

( * ) Notice: Subject to any disclaimer, the term of this patent is extended or adjusted under 35 U.S.C. 154(b) by 438 days.

(21) Appl. No.: 17/699,785

(22) Filed: Mar. 21, 2022

(51) Int. Cl.
*A62C 13/78* (2006.01)

(52) U.S. Cl.
CPC .................................... *A62C 13/78* (2013.01)

(58) Field of Classification Search
CPC ........ A62C 13/78; A47B 47/042; A47B 7/041
USPC ........ 312/265.5, 265.6, 257.1, 263; 248/519, 248/523, 146, 311.2; D29/130
See application file for complete search history.

(56) References Cited

U.S. PATENT DOCUMENTS 2,486,932 A * 11/1949 Sellors ................... A47G 7/041 47/41.13
2,536,144 A * 1/1951 Siptrott ................... B43L 25/00 248/346.04
D241,699 S * 10/1976 Barecki ..................... D6/708.17
4,171,150 A * 10/1979 Soderlund .............. A47B 96/00 312/265.5
D522,180 S * 5/2006 Goria, II ...................... D29/130
7,607,916 B2 * 10/2009 Almodovar ............... F23D 3/26 431/290
D876,729 S * 2/2020 Kincaid ....................... D29/130
D1,035,910 S * 7/2024 Yu ................................ D25/133
2004/0222337 A1 * 11/2004 Goria, II ................ A62C 13/78 248/146
2006/0250052 A1 * 11/2006 Davis ...................... F16B 12/26 312/107
2007/0158526 A1 * 7/2007 Platt .................... E04H 12/2261 248/188.4

FOREIGN PATENT DOCUMENTS

CN 201183962 Y * 1/2009
JP H0437935 * 9/1992
JP 2003191952 A * 7/2003

OTHER PUBLICATIONS

English translation CN201183962 (Year: 2009).*
English translation JPH0437935 (Year: 1992).*

* cited by examiner

*Primary Examiner* — Janet M Wilkens
(74) *Attorney, Agent, or Firm* — John R Casperson

(57) ABSTRACT

A stand for a fire extinguisher comprises four identical panels and a square plate. Each panel has a rectangular portion and an isosceles trapezoid-shaped portion. The isosceles trapezoid-shaped portion has only two sides of equal length. The four identical panels are interconnected along their equal-length sides to form a truncated square pyramid having a rectangular box at its upper end. The square plate is mounted inside of the rectangular box parallel to a base of the pyramid to support a fire extinguisher.

8 Claims, 7 Drawing Sheets

STAND FOR FIRE EXTINGUISHER

FIELD OF THE INVENTION

One embodiment of the invention relates to a stand for positioning a fire extinguisher to good visibility.

BACKGROUND OF THE INVENTION

On a job site, clutter can make it difficult to easily locate a fire extinguisher or first aid necessities from a distance.

Elevating these items above floor clutter and closer to eye height can reduce the time required to locate them, an important factor in an emergency.

Prior art stands for fire extinguishers accomplished this, but were bulky, and thus relatively expensive, to ship and transport.

A fire extinguisher stand that packs near flat in unassembled form facilitates getting the stand to the job site.

OBJECTS OF THE INVENTION

Our fire extinguisher stand is designed to collapse flat for shipping and can optionally mount a first aid kit or eyewash carrier on the side panels as well as provide for installation of a sign or flag.

SUMMARY OF THE INVENTION

A stand for a fire extinguisher comprises four identical panels and a square plate. Each panel has a rectangular portion 8 and an isosceles trapezoid-shaped portion. The isosceles trapezoid-shaped portion has only two sides of equal length. The four identical panels are interconnected along their equal-length sides to form a truncated square pyramid having a rectangular box at its upper end. The square plate is mounted inside of the rectangular box parallel to a base of the pyramid to support a fire extinguisher.

Where the panels and square plate snap into position, the stand can be economically shipped or transported in disassembled, very compact, form, and put together quickly on the job site.

DETAILED DESCRIPTION OF THE INVENTION

Figure 1:
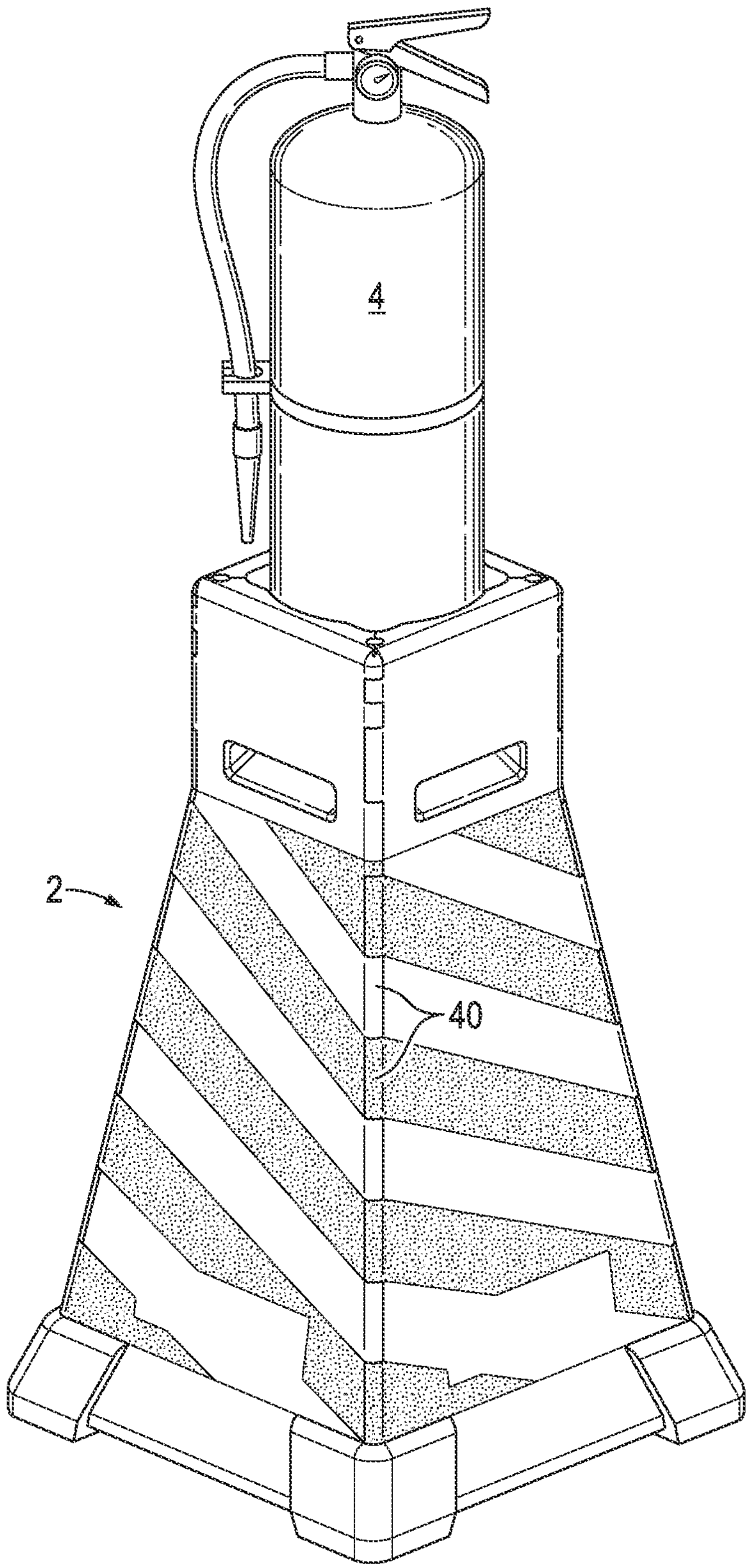
FIG. 1 is a pictorial of one embodiment of the invention in use to support a fire extinguisher.
Figure 2:
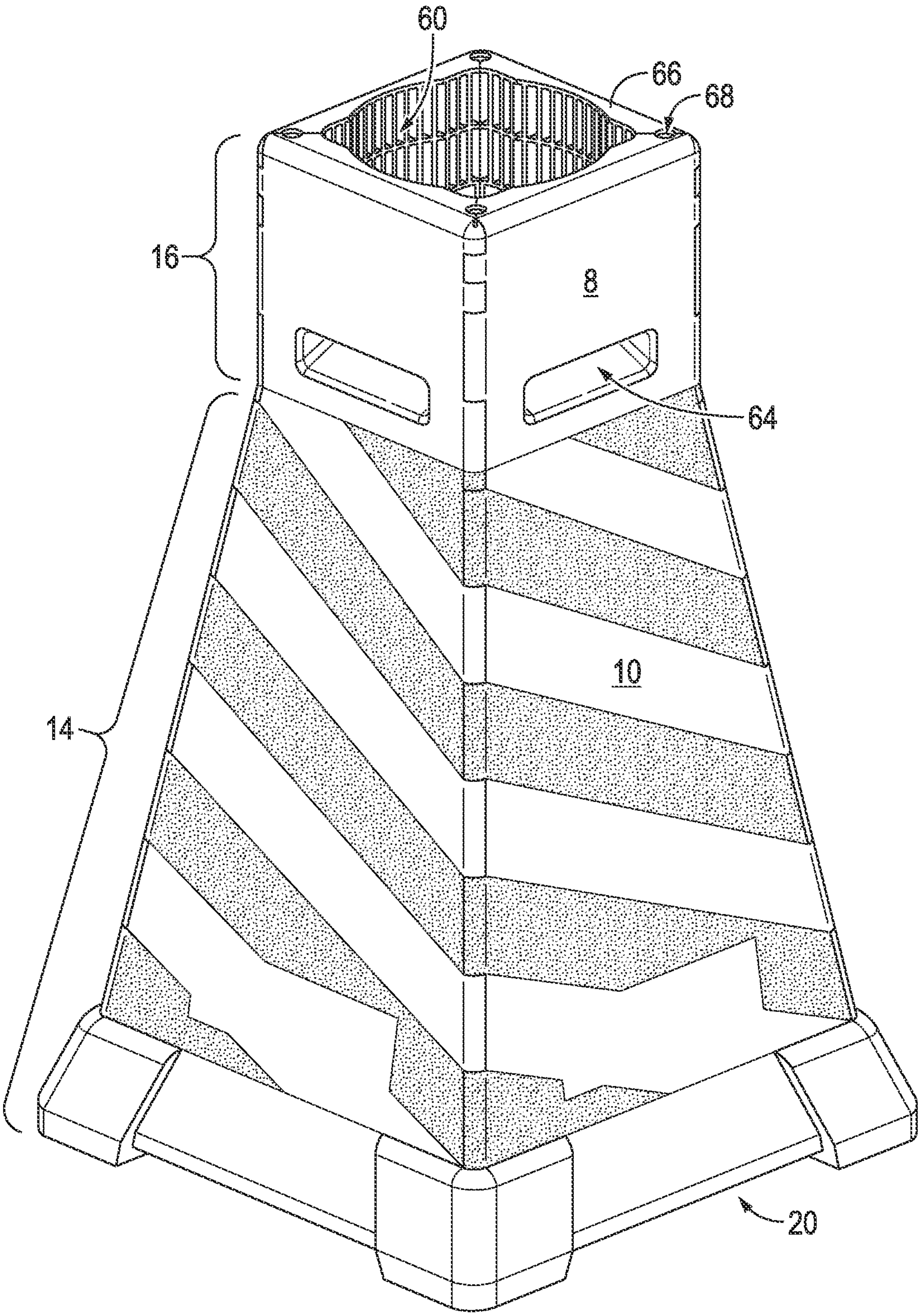
FIG. 2 is a view of the invention of FIG. 1 without the fire extinguisher.
Figure 3:
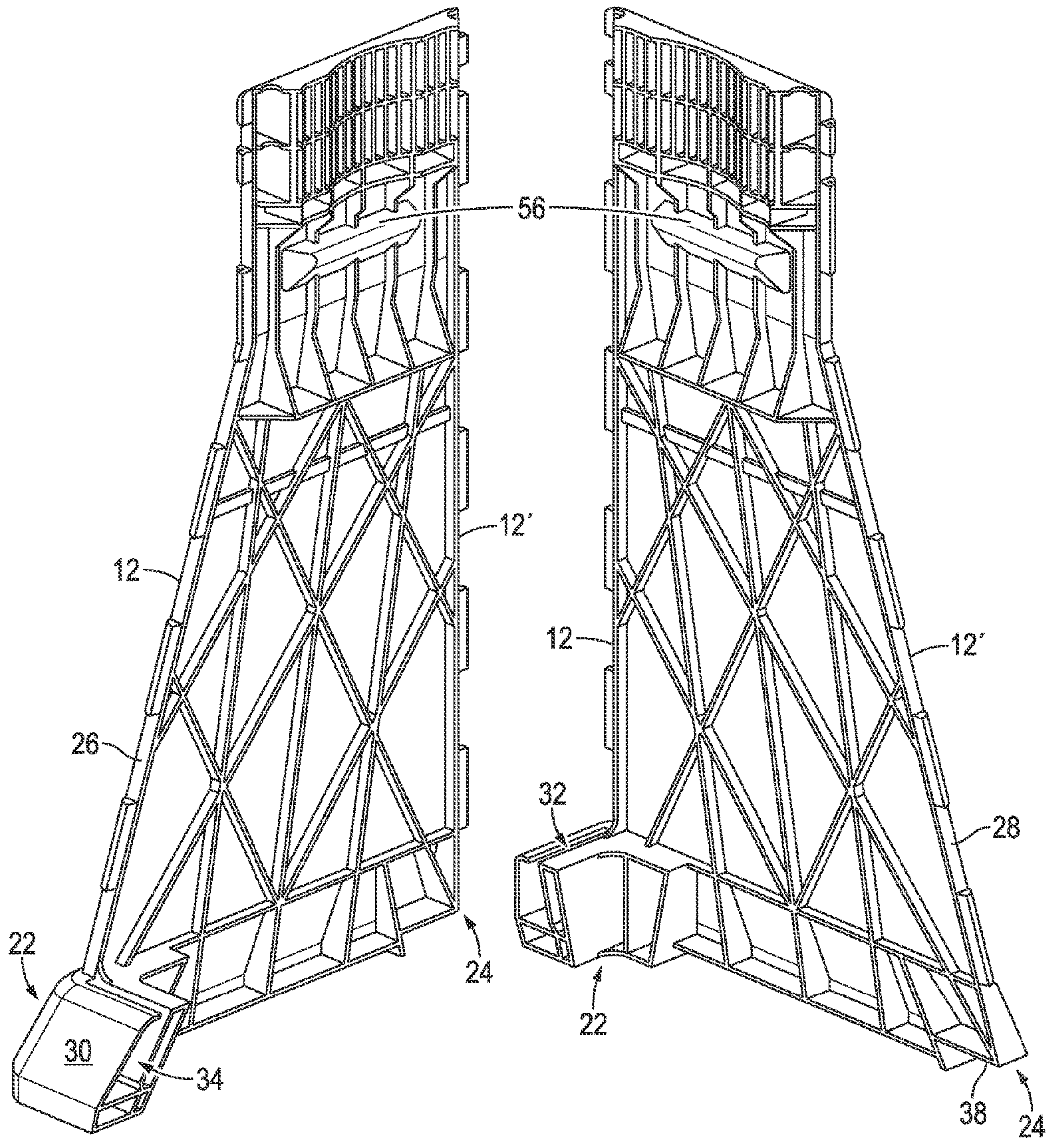
FIG. 3 is an exploded view of a portion of the invention of FIG. 2 showing internal details.
Figure 4:
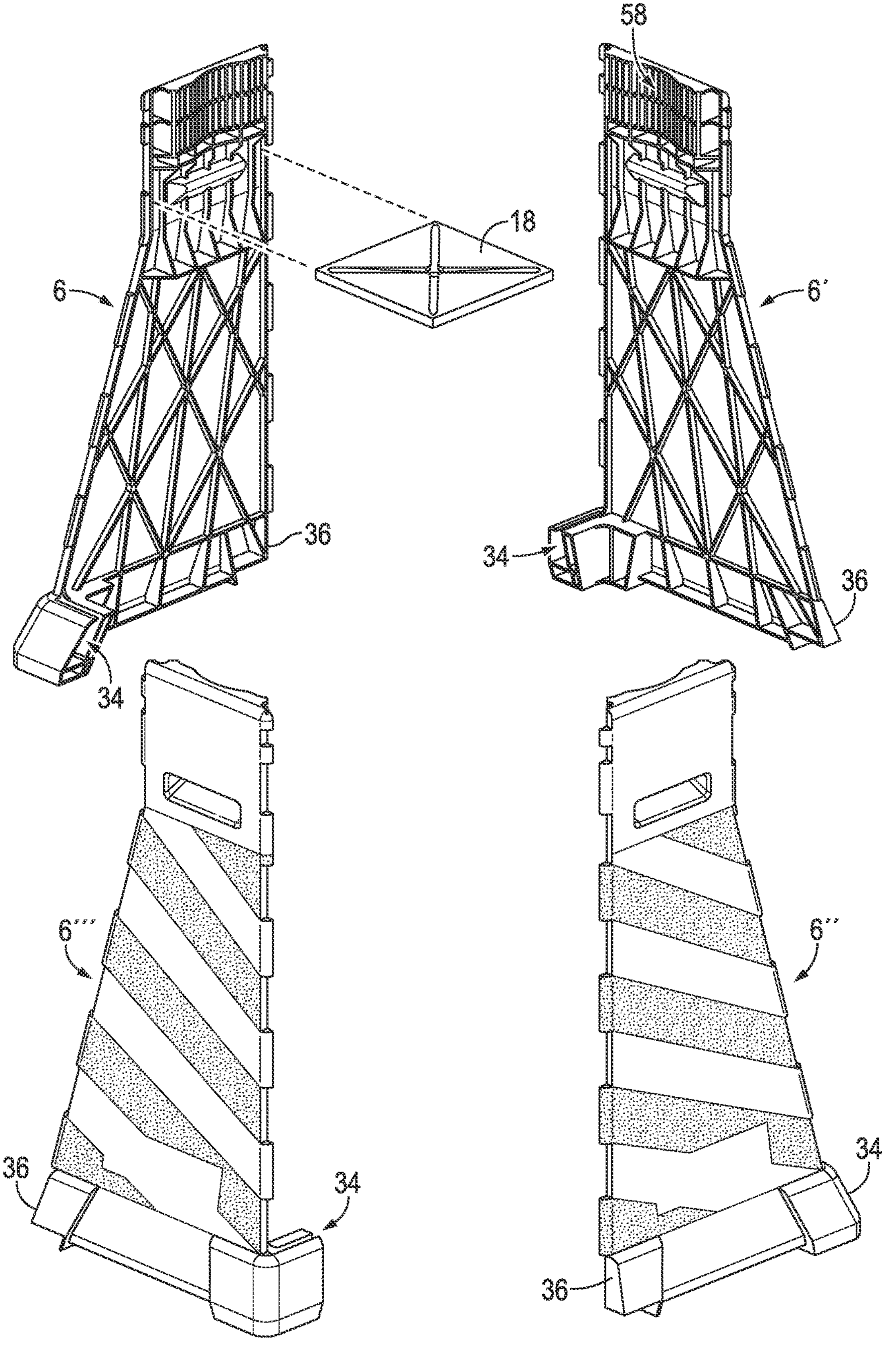
FIG. 4 is an exploded view of the invention of FIG. 1 showing assembly details.
Figure 5:
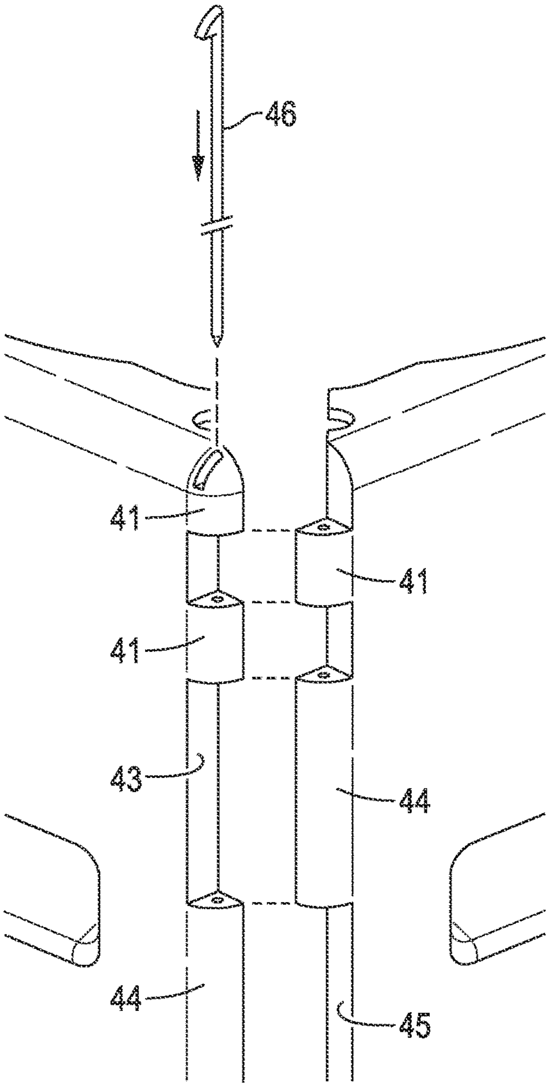
FIG. 5 is an exploded view of a portion of the invention of FIG. 1 showing assembly details.
Figure 6:
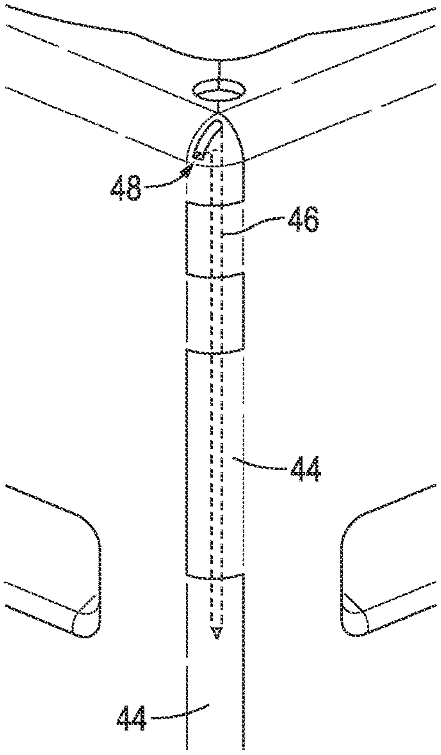
FIG. 6 is a pictorial view of a portion of the invention of FIG. 1 showing internal details in dashed lines.
Figure 7:
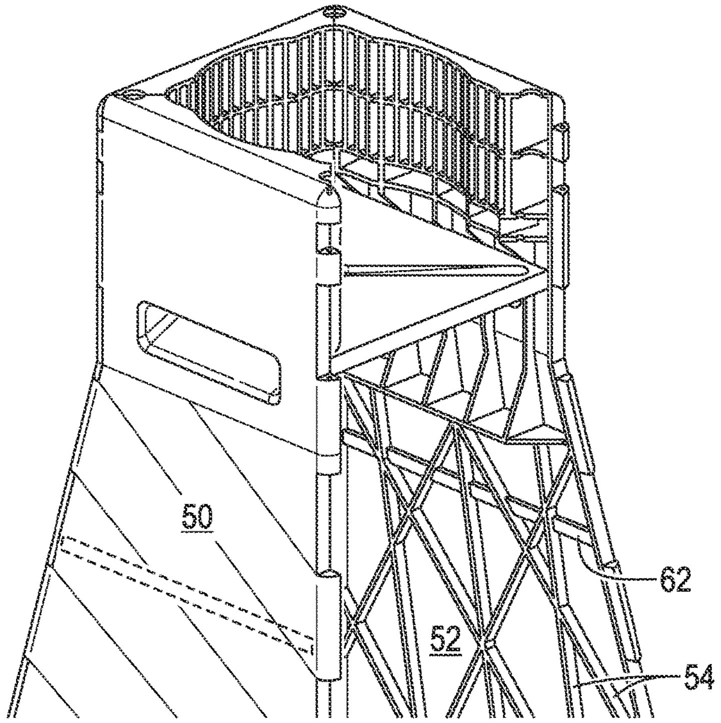
FIG. 7 is a pictorial view of a portion of the invention of FIG. 1 showing internal details.
Figure 8:
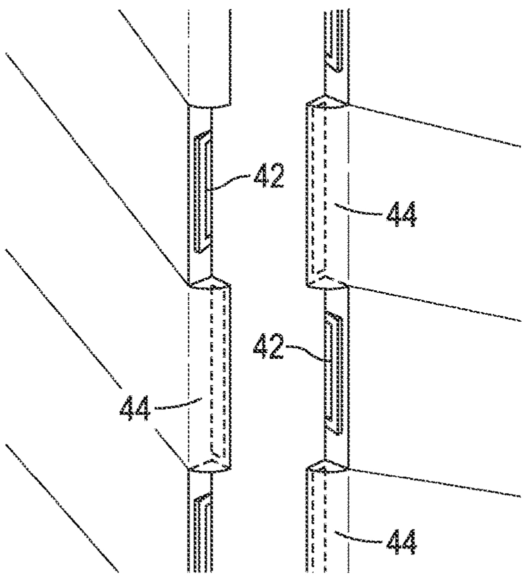
FIG. 8 is a pictorial view, from the outside, of a portion of the invention of FIG. 1 showing assembly details.

In one embodiment of the invention, a stand 2 for a fire extinguisher 4 comprises four identical panels 6, 6', 6", 6'" and a square plate 18. Each panel has a rectangular portion 8 and an isosceles trapezoid-shaped portion 10. The isosceles trapezoid-shaped portion has only two sides 12, 12' of equal length. The four identical panels are interconnected along their equal-length sides to form a truncated square pyramid 14 having a rectangular box 16 at its upper end. The square plate is mounted inside of the rectangular box parallel to a base 20 of the pyramid to support a fire extinguisher 4.

The trapezoid-shaped portion of each panel has a first lower corner 22 and a second lower corner 24, a first side edge 26 extending upwardly from the first lower corner, and a second side edge 28 extending upwardly from the second lower corner. A box receptacle 30 is at the first lower corner. The box receptacle has a slotted top 32 and forms a socket 34 that receives a second lower corner 36 of an adjacent panel at a right angle to form a square pyramid base corner for the truncated square pyramid. A step recess 38 is located along the lower edge at the second lower corner to facilitate sliding the corner into the socket.

Figure 9:
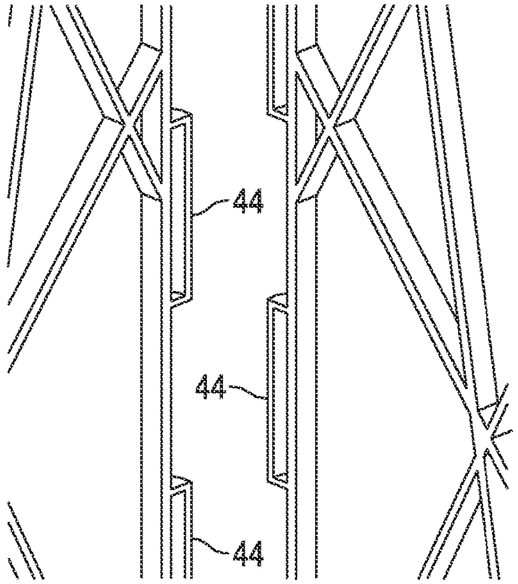
FIG. 9 is a pictorial view, from the inside, of a portion of the invention of FIG. 1, showing further details.

The first side edge and the second side edge of the trapezoid-shaped portion of each panel carry alternating ears 44 and ridges 42 positioned so that the ears of one panel cup over the ridges of an adjacent panel to interconnect the panels when the second lower corner of the adjacent panel is received by the box receptacle. Preferably, the ears, along with the rest of the features, are shelled out to achieve a roughly uniform material thickness throughout the part. The outermost lip (vertical edge) of each ear rides up the sloped profile of each corresponding ridge until it cups over and is held from backing out. See FIG. 9. The second lower corner of each panel plugs into a receptacle behind the bottom right corner of the next panel by a distance of about ~85 mm. In the final ~9 mm of plugging the panel bases together, the ears along each edge of the panel deflect over corresponding ridges and snap together.

The rectangular-shaped portions of the panels each has a first side edge 43 and a second side edge 45 that carry alternating hinge leaves 41 that interdigitate when the rectangular panel portions are formed into the rectangular box. Four hinge pins 46 locate the leaves. The outside lower lip of the hinge pin head has an undercut to provide an access point 48 to allow the hinge pins to be pried out with a tool. For example, a screwdriver can be used to move a hinge pin sufficiently so that it can be extracted and the stand disassembled.

In the illustrated embodiment, each panel has an outer surface 50 and an inner surface 52. Stiffening ribs 54 are formed on the inner surface. The stiffening ribs on the inner surface of the trapezoid shaped portion extend lengthwise, diagonally, and parallel to the diagonally extending ribs. The stiffening ribs on the inner surface of the rectangularly shaped portion extend longitudinally and laterally. The inner surface of the stiffening ribs on the rectangularly shaped portion defines a semi-cylindrical frame 58, which, together with the inner surfaces of the stiffening ribs of the other three panels forms a cylindrical frame 60 for laterally supporting a bottom portion of a fire extinguisher.

In a preferred embodiment of the invention, an inner surface of the trapezoid shaped portion defines a lateral band 62 of thickened material to facilitate screw attachment for the mounting of accessories such as first aid kits or eye wash kits. The stand is preferably formed from an injection moldable thermoplastic, for example HDPE or PP.

In a further preferred embodiment, a recess 64 is formed in the outer surface of the rectangularly shaped portion of each panel to provide carry points for the stand. A corresponding protrusion 56 is formed on the inner surface of the rectangularly shaped portion of each panel to provide a support area for the square plate.

Figure 10:
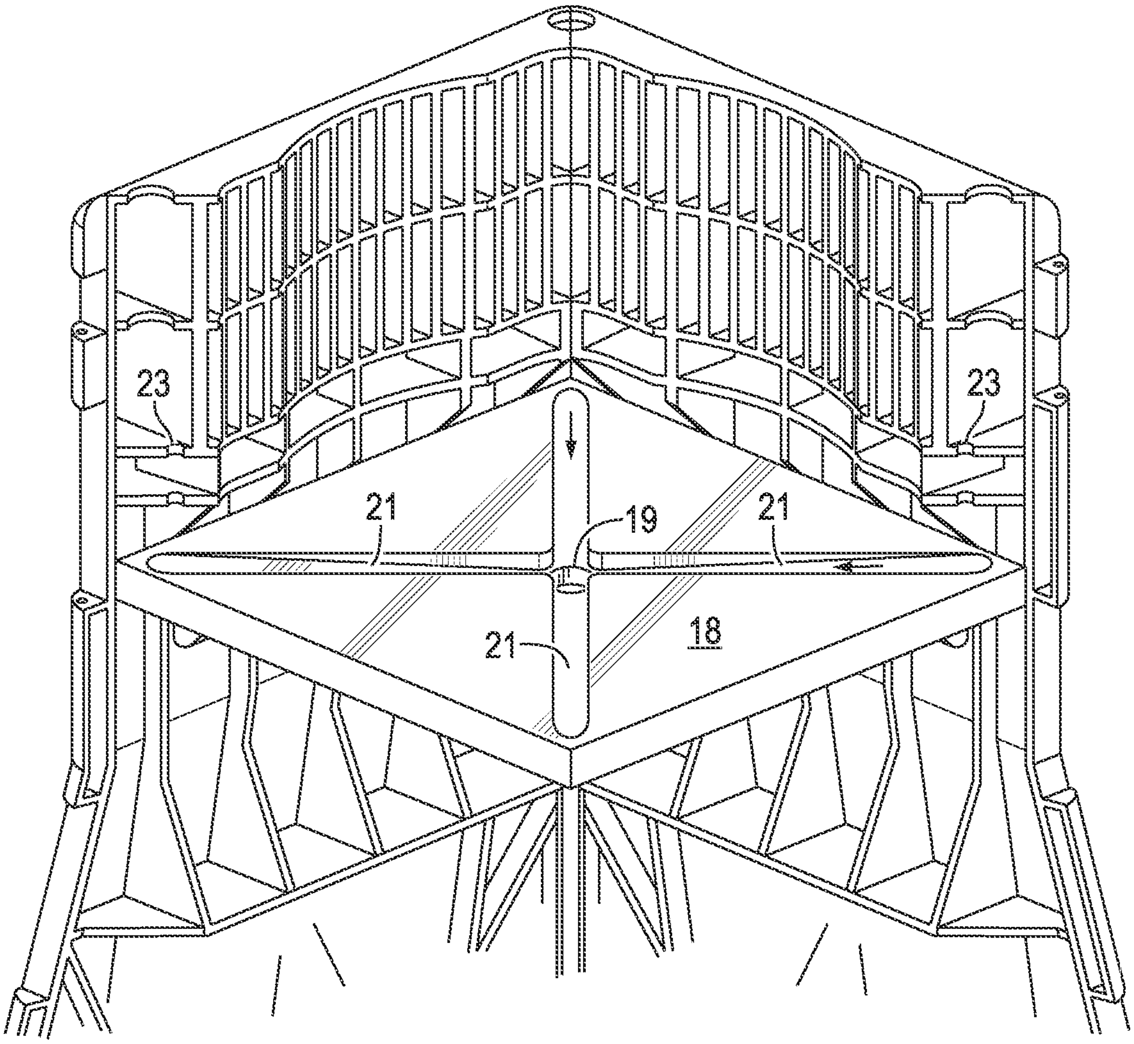
FIG. 10 is a detailed pictorial view of a portion of the invention of FIG. 1, showing additional details.

In a further preferred embodiment, an arcuate shelf 66 is provided at an upper end of each panel and a hole 68 is defined in each of the four corners where the arcuate shelves come together. The holes are preferably blind to provide a mounting point for flags, for example. Offset drain holes 23 are defined where adjacent panels come together at the blind holes to permit liquids to escape. The holes drain into channels 21 formed in plate 18 which lead to a central drain hole 19 through the plate. See FIG. 10.

While certain preferred embodiments have been described herein, the invention is not to be construed as being so limited, except to the extent that such limitations are found in the claims.

What is claimed is:

1. A stand for a fire extinguisher comprising four identical panels each having a rectangular portion and an isosceles trapezoid-shaped portion, the isosceles trapezoid-shaped portion having only two sides of equal length, the four identical panels being interconnected along their equal-length sides to form a truncated square pyramid having a rectangular box at its upper end, and a square plate mounted inside of the rectangular box parallel to a base of the pyramid to support a fire extinguisher, wherein the trapezoid-shaped portion of each panel has a first lower corner and a second lower corner, a first side edge extending upwardly from the first lower corner, and a second side edge extending upwardly from the second lower corner, and a box receptacle at the first lower corner, said box receptacle having a slotted top and forming a socket that receives a second lower corner of an adjacent panel at a right angle to form a square pyramid base corner for the truncated square pyramid, and a step recess along the lower edge at the second lower corner to facilitate sliding the second lower corner into the socket.

2. A stand as in claim 1 wherein the first side edge and the second side edge of the trapezoid-shaped portion of each panel carry alternating ears and ridges positioned so that the ears of one panel cup over the ridges of an adjacent panel to interconnect the panels when the second lower corner of the adjacent panel is received by the box receptacle.

3. A stand as in claim 2 wherein the rectangular-shaped portions of the panels each has a first side edge and a second side edge that carry alternating hinge leaves that interdigitate when the rectangular panel portions are formed into the rectangular box, and four hinge pins locating the leaves.

4. A stand as in claim 3 wherein each hinge pin has a head with an undercut for removal with a tool.

5. A stand for a fire extinguisher comprising four identical panels each having a rectangular portion and an isosceles trapezoid-shaped portion, the isosceles trapezoid-shaped portion having only two sides of equal length, the four identical panels being interconnected along their equal-length sides to form a truncated square pyramid having a rectangular box at its upper end, and a square plate mounted inside of the rectangular box parallel to a base of the pyramid to support a fire extinguisher, wherein each panel has an outer surface and an inner surface with stiffening ribs formed on the inner surface, wherein the stiffening ribs on the inner surface of the trapezoid shaped portion extend lengthwise, diagonally, and parallel to the diagonally extending ribs, wherein the stiffening ribs on the inner surface of the rectangularly shaped portion extend longitudinally and laterally, wherein the inner surface of the stiffening ribs on the rectangularly shaped portion defines a semi-cylindrical frame, which, together with the inner surfaces of the stiffening ribs of the other three panels forms a cylindrical frame for laterally supporting a bottom portion of a fire extinguisher.

6. A stand as in claim 5 wherein an inner surface of the trapezoid shaped portion defines a lateral band of thickened material to facilitate screw attachment.

7. A stand as in claim 5 wherein a recess is formed in the outer surface of the rectangularly shaped portion of each panel and a corresponding protrusion on the inner surface of the rectangularly shaped portion of each panel, the recess providing a carry point to move the stand and the protrusion providing a support area for the square plate.

8. A stand as in claim 5 wherein an arcuate shelf is provided at an upper end of each panel and a hole is defined in each of the four corners where the arcuate shelves come together.

* * * * *